Inventor
G. C. HARTLEY
Attorney

Fig. 4.

Recording

| Element Pulse N° | Function | |
|---|---|---|
| 1 | Start Pulse | |
| 2-17 | Sub. Identity Record | With Track Section Pulses TS |
| 18-20 | Call Category Record | |
| 21-24 | Fee Record | |
| 25-35 | Ans. Time Record | |
| 36 | Reset | |

Reading

| Element Pulse N° | Function | |
|---|---|---|
| 34 | Start Pulse | |
| 35-14 | Sub. Identity Reading | With Track Section Pulses TR |
| 15-17 | Call Category Reading | |
| 18-21 | Fee Reading | |
| 22-32 | Ans. Time Reading | |
| 33 | Reset | |

Table I

May 16, 1961  G. C. HARTLEY  2,984,703
SUBSCRIBER BILLING IN AUTOMATIC TELECOMMUNICATION
EXCHANGE SYSTEMS AND THE LIKE
Filed May 19, 1954  14 Sheets-Sheet 8

*Inventor*
G. C. HARTLEY
By
*Attorney*

May 16, 1961  G. C. HARTLEY  2,984,703
SUBSCRIBER BILLING IN AUTOMATIC TELECOMMUNICATION
EXCHANGE SYSTEMS AND THE LIKE
Filed May 19, 1954  14 Sheets-Sheet 11

Inventor
G. C. HARTLEY

Fig. 12. 'B' Drum Track Selection

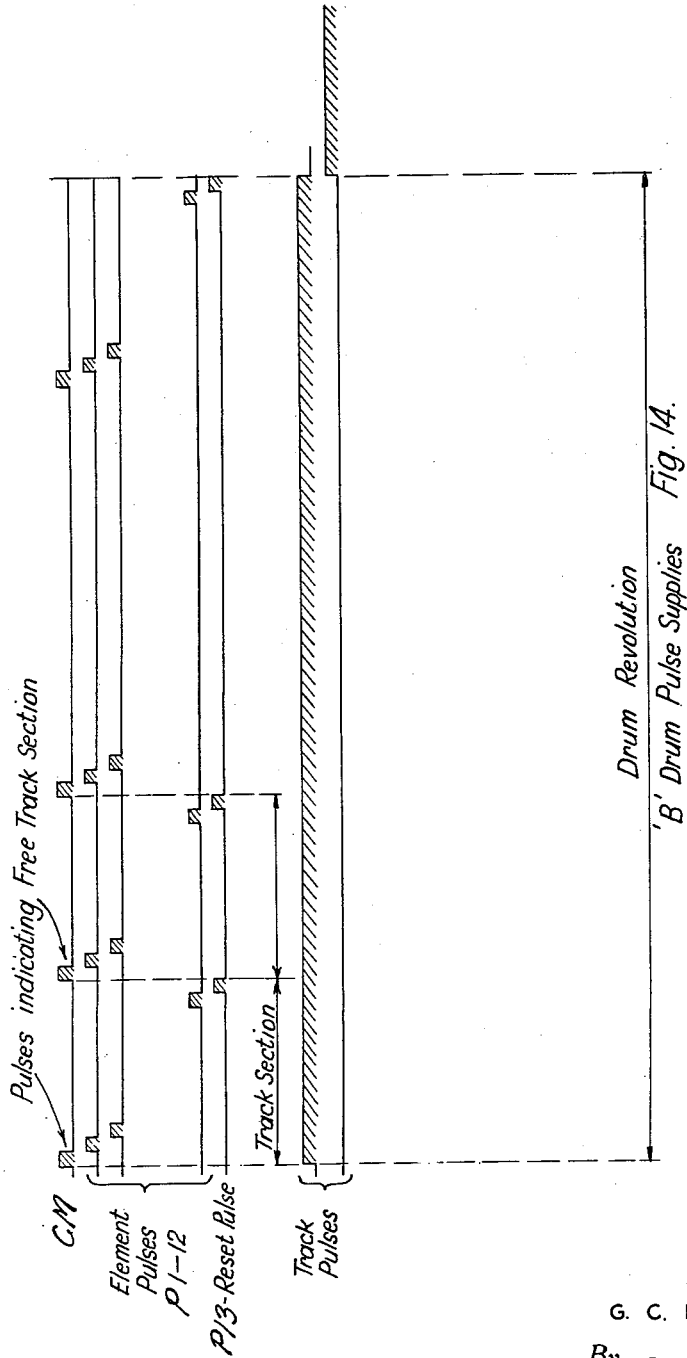

United States Patent Office 2,984,703
Patented May 16, 1961

2,984,703

SUBSCRIBER BILLING IN AUTOMATIC TELECOMMUNICATION EXCHANGE SYSTEMS AND THE LIKE

George Clifford Hartley, London, England, assignor to International Standard Electric Company, New York, N.Y., a corporation of Delaware Filed May 19, 1954, Ser. No. 430,942

Claims priority, application Great Britain May 22, 1953

4 Claims. (Cl. 179—7.1)

This invention relates to the storage of intelligence and more particularly, but not exclusively, to the storage of call accounting information in telecommunication exchange systems.

The object of the invention is to increase the field of use—of intelligence stores—and to bring automatic call-accounting equipment for telecommunication exchange systems within the field of practical cost limits.

One feature of the invention comprises a telecommunication exchange system in which said call accounting information stored in said individual stores includes the time of starting a connection and which comprises clock equipment, a comparator for comparing the starting times of current connections with the time of day to determine the end of chargeable time periods, and signalling equipment for sending a warning signal to a calling substation.

Another feature of the invention comprises a method of recording call accounting information in a telecommunication exchange system, where call accounting information relative to each connection is automatically accumulated during the connection in a store having no numerical or like relation to the substation liable for the connection and said information is automatically transferred at the end of the connection to a store which has a numerical or like relation to the substation liable for the connection and which is capable of storing information relating to a number of connections.

The invention will be clearly understood from the following description of one embodiment thereof utilising magnetic drums as intelligence storage devices, and shown in the accompanying drawings in which:

Fig. 1 shows a magnetic drum (A drum) circuit for storage of call accounting information individual to a junction outgoing from a telephone exchange, Fig. 2 shows a magnetic drum (B drum) circuit for storing call accounting information sorted on a substation group basis, Fig. 3 shows pulse supplies whose functions in relation to the various detailed circuits shown in Figs. 5–14 will be described later, Fig. 4 gives in tabular form the allocation of the various element positions of a magnetic drum track section to various uses for call accounting purposes, Fig. 5 shows part of an Outgoing Junction Circuit containing information relevant to describing this invention, Fig. 6 also shows the relevant portions of a Toll Register which is associated with an Outgoing Junction Circuit, such association means being shown as a cross-bar switch, Fig. 7 shows the circuit for recording on the "A" Drum the identity of the Calling Subscriber, Fig. 8 shows the circuit for recording the time of answer of a call established via an Outgoing Junction on the "A" Drum.

Fig. 9 shows the circuit for providing the facility of supplying a tone to a Calling Subscriber in a Toll Connection if the call lasts for longer than 3 minutes, Fig. 10 shows the circuit for transferring information stored on the "A" Drum to a temporary store associated with a Computer which in turn will control the recording of information on to a "B" Drum, Fig. 11 shows the circuit for recording information on to the periphery of a Magnetic Drum, Figs. 12 and 13 show the circuits for recording information on the "B" Drum in the correct track, Fig. 14 shows the pulse supplies for recording information on the "B" Drum.

A magnetic drum such as the "A" Drum as used in this invention has a number of separate parallel peripheral tracks, each track being subdivided into track sections, and each A drum track section is allocated to an outgoing junction; "clock" pulses are derived from a track on the drum as is well known in the art, there being one such clock pulse, later described as an "element" pulse PE, for each element position in a track section. For the A Drum, each track section consists of 36 element positions for recording binary elements and information is stored in each section by magnetising these elements in a pattern depending on the information to be stored. A pulse TS is supplied for each track section and a pulse TP is supplied for each revolution of the drum, there being as many TP pulses as there are tracks on the drum. Thus a TP pulse will denote a track on the drum, pulse TS the track section, and element pulses, the elements in such track sections. Control pulses T1, T2 are derived from the clock pulses and occur during each element position. Pulses shown as TR are also provided which are displaced by a number of element positions from the TS pulses for reasons which will be described later.

Each track section has 36 such element pulses PE and Table I Fig. 4 shows the function of these pulses which will become apparent in the following description.

The methods available for call accounting range from, at the one extreme, pure multi-metering on a time and zone basis with complete bulk billing and no analysis whatever of the nature and timing of the calls involved, to, at the other extreme, automatic ticketing with individual docket recording full particulars of every call. The American AMA (automatic message accounting) system is in the latter category but instead of individual dockets the call particulars are recorded on perforated tape and the set-up is arranged to permit fully automatic preparation of accounts. In between these extremes there are possible various forms of record which give a more satisfactory picture of the build-up of the account than pure bulk billing without going to the extreme length of retaining full permanent records of every call. In this region the magnetic drum is an extremely convenient form of intermediate store because of the ease of access to any piece of information and the possibility of adding to it from time to time as well as when required, transferring it to other sections of the available store capacity and thus executing sorting operations which in the AMA scheme means the consumption of literally miles of paper.

The exact nature of the information finally recorded and displayed on accounts is capable of many variations. The object of the present invention is to provide the maximum amount of useful information which can be recorded with a simple and inexpensive scheme.

An embodiment of the invention will now be described, which will present a periodic account with the total charge attributable to calls in various categories separately listed. The category of call can be defined in terms either of unit cost or overall distance; e.g. all calls up to 15 miles might be bulk billed in the present manner, category A calls could be 15 to 25 miles, category B 25 to 50, category C 50 to 100, and so on. On this basis some 4 or 5 categories would probably be sufficient, Each category might directly correspond to a certain basic fee. Alternatively, there could be two or three fees within each category.

The general basis of operations is as follows: The group of automatic outgoing toll junctions, or transmission channels with their associated registers are linked with a magnetic drum referred to as the A drum on which the primary record would be made. This drum has a predetermined section of track allocated to every junction circuit and on this would be recorded the calling line or substation identity, the call category and basic fee (determined by register) and the time of answering a call. At the end of the call, the outgoing junction circuit delivers a signal to call for a B drum or intermediate recording drum to take over the record. The control circuit for this drum extricates the information from the appropriate section of the A drum and performs the computing operations of determining length of call by comparing answer time from the A drum against clear time as indicated direct from the clock and correlating this with the basic fee so as to derive the total charge. The resultant information is then recorded on a track of one of the B drums in the form of calling number, category and total charge. The records on the B drums are partially sorted. This could be done in a variety of ways and the one suggested here is to have a track for each 100 subscribers of which the individual call particulars for the day can be recorded in a random arrangement. More detailed sorting than this is perfectly feasible even to the extent of sorting into individual lines but in view of the widely varying density of automatic toll traffic being originated this would probably be excessively wasteful of track capacity. With the scheme outlined if any track were to become filled the record could easily be extended on to one of a number of spare tracks.

At the end of the day, and this could easily be an automatic midnight process, a tape recorder with its control circuits could scan the B tracks in turn and having performed the necessary addition, record on the tape the daily totals for each category of call for each of the lines. This process can easily be executed at something like the 100 to 600 lines per minute rate according to the width of paper used and the number of rows of perforations per record. Actually, the operation might well be faster than this because many lines would have nothing to record and these could be omitted. In any case the total time needed to complete the records for a big 20,000 or 30,000 line block need only be of the order of an hour or so while the amount of paper involved would only run to a few feet per 1000 lines. Such a process is described in principle in British Patent No. 715,985.

It is assumed that this tape record would remain the key record from which, in due course, accounts could be prepared—using an accounting drum on which is allocated sufficient track space for each subscriber in 100 lines to enable the complete cumulative records to be stored. The tape information would then be fed into this totalising drum controlled by the necessary addition circuits. The tape could be fed either by scanning its entire length and allowing the device to select the required section or by precutting into 100 line sections and feeding these into the machine. Alternatively, ten tape records instead of one, could be produced in a 10,000-line office so that the tapes would need to be scanned only 10 times.

The advantages of this arrangement as compared with bulk billing are that it would give in the paper tape a permanent record sufficiently detailed to be quoted to the subscriber when necessary in case of disputed accounts as well as a final amount which would give the subscriber a clearer idea of the classes of calls which he has made. A further advantage would be that the ease of access to the drum records is such that the provision of ADC service on something like the present lines would be easy. The scheme as outlined does not include an individual timing device associated with each outgoing junction, the total time being computed from the drum records. This as it stands would mean the loss of the warning pips facility but these could easily be reinstated by a monitoring circuit which would continually scan the A drum records and signal the arrival of the successive 3 minute periods, as described below.

GENERAL DESCRIPTION

The equipment required is shown in functional form in Figs. 1 and 2. Broadly stated, the system operates as follows.

An outgoing junction circuit OGJ, Fig. 1 is seized from a subscriber's line circuit via a line switch LS and the 0 level of the first selector and in turn seizes a free toll register which is shown for convenience as being connected via a cross-bar switch. When the toll register has received the necessary digits to determine the type of call, the Register Scanner (the job of which is to pick out one register at a time), will cause the register to apply for identification by issuing a signal F3A. The signal will be transmitted to OGJ circuit and this in turn will transmit a suitable identification signal back to the line circuit. The foregoing functions are known from prior art identification arrangements, as, for instance, as shown in U.S. Patent 2,913,530. In that patent it is explained how a voltage is derived upon identification of a calling subscriber's line (see column 5, lines 7–24 of said patent). The potential, derived as taught in said patent, can be applied to F22 to denote the completion of the identification. The signal, F7A, from OGJ will partially condition the related gate GP. When calling line identification is complete, a signal F22A further conditions gate GP. This gate also receives timing and selecting signals TS, SP(PE1) and TP. Signals TS and SP respectively come from a TS Section Allotter and a PE1–36 Unit Marker both under control of a clock track of drum A, and track signal TP also is derived in known manner from a clock track on the drum. In response to the timing and selecting signals, the conditioned gate GP applies an output signal via the Primary Record lead to a flip-flop or trigger F8. The trigger thereupon produces a signal F8A for the period of travel of an allotted track section past a recording position of the drum. The signal F8A conditions gates in Fig. 7 to respond to signals from the Line Identity Store at element times PE2–17 and also conditions gates in Fig. 6 to respond to Category & Fee value signals from the Toll Register at times PE18–24. The operated gates in Figs. 7 and 6 control the Recording Circuit in Fig. 11 to cause the number of the calling line or substation to be recorded in element positions 2–17 of the allotted track section and the category and fee to be recorded in element positions 18–24 of the same track section. It will be appreciated (1) that there is one gate GP for each one of the transmission channels or junction circuits OGJ; (2) that a group of OGJ circuits are linked via their respective GP gates to one trigger F8; (3) that this trigger F8 and the gates in Figs. 6 and 7 controlled thereby as well as the Recording Circuit in Fig. 11 are all common to one drum track; and (4) that selection of sections of this track results from placing the gates GP for the respective OGJ circuits under control of different section signals TS. It will be appreciated also that there are as many triggers F8 and associated recording control circuits as the number of data receiving tracks of the drum A and that each F8 trigger is controlled by a different group of gates GP.

Similarly, there is one gate GT for each OGJ unit and the outputs of a group of GT gates are connected via an Answer lead to a trigger F14. When a called party answers, the seized OGJ unit puts a conditioning signal F7C on its gate GT. This gate GT receives the same timing and selection signals TS, TP and SP as gate GP of the same OGJ unit. Hence the conditioned gate GT operates F14 to produce signal F14A just as the same track section which previously received data under control of the same OGJ unit starts passing the recording position. The signal F14A enables recording control gates in Fig. 8 to respond to time signals from a Clock Circuit and to pulses PE25-35, whereby the answer time is recorded in the allotted track section within positions 25-35. The number of cycles of the drum A which intervene between the recording of the calling substation identity and category and fee in positions 2-24 of a track section allotted to the seized OGJ unit and the recording of the answer time in positions 25-35 of this track section depends on how long a time elapses between the call and the answer. Meanwhile recording in other drum sections may occur, in the same or in different tracks, under control of other seized OGJ units, each such unit having a different track section allotted to it.

At the end of the call, the unit OGJ cooperates with the End of Call Scanner and in its proper turn puts a conditioning signal F7E on its gate GC. If the gate is also conditioned by a Computer Free signal F23A, then timing and selecting signals TR, PE34 and TP cause the gate to activate a Clear lead just as the drum A track section for the OGJ unit starts traversing the Read A position. The activated Clear lead initiates transfer of the data from the drum A track section to intermediate storage as a first step in a next stage of operations outlined in Fig. 2. This next stage involves the recording of the charge for the call in a free section of a B drum track bearing a numerical relation to the substation liable for the call. In the present example, the B track selection is made in accordance with thousands and hundreds part of the substation identifying number and the remaining part of this number will be recorded along with a computed charge in a free section of the selected track or drum B. The charge will be derived by a Charge Computer from the category and fee in conjunction with the elapsed time as determined by the answer time and the Clear Time taken from a Clock Circuit. The computed charge is applied via a register F31 to Recorder Gates conditioned by the B track selecting means, and the tens and units part of the call number along with the computed charge will be recorded in a free section of the selected track, in positions of this section selected by pulses P1-12 derived from a clock track of drum B.

DETAILED DESCRIPTION

The detailed circuits of Figs. 5-14 will now be described. These circuits utilise functional symbols to indicate electronic circuit tools, the detailed design of which is well known.

Before proceeding with the detailed description of the circuits, an explanation of the circuit conventions will be given.

Electronic gates, well-known per se, are shown as circles with incoming controls shown as radial leads with arrow-heads touching the circle. Outputs are shown as radial leads with arrow-heads pointing radially outwards. The number inside the circle indicates the total number of controls which must be energised for the gate to deliver an output; for instance, if there are four controls, and the number in the circle is "2" then the gate will deliver an output when any two of its controls are energised.

The remaining conventions to be described are those for flip-flops, decimal counters and multi-stable registers and binary pattern registers.

A decimal counter comprising a number of single-component stages each of which is capable of assuming one of two conditions, on or off, is shown as a series of rectangles drawn in linear array. The counters shown all count to the end of their cycle and then reset during ordinary operation. A multi-stable register, is shown in a similar manner to a counter. A multi-stable register is similar to a counter, but it does not usually run through its full cycle. Like a counter it has only one stage operated at once, and depending on circumstances any stage can operate in any order rendering the previously operative stage inoperative.

A flip-flop of the bistable type is essentially a two stage multi-stable register and is shown as a pair of adjacent rectangles with the letters A and B in respective of said rectangles, each letter denoting a different stage. The flip-flop is a switch having a closed condition or an opened condition corresponding to the closed or open positions respectively of any type electrical switch.

A binary pattern register comprises a flip-flop of the bi-stable type at each stage and is capable of recording a pattern of binary digits, one in each stage: in normal conditions, like components of every stage are operated, and the other component of any stage is operated to register binary digit 1 in place of 0.

If the flip-flop and other circuit outputs were connected to all the gates which they control there would be a complex network of leads which would be difficult to follow. These leads have therefore been omitted and the short control leads to the gates have been given references determined by the flip-flop or other circuit concerned and by the unit of the flip-flop energising the lead. Thus flip-flop F14 can energise lead F14A, for instance the final A indicating which unit of the flip-flop is energising the lead.

Figure 6:
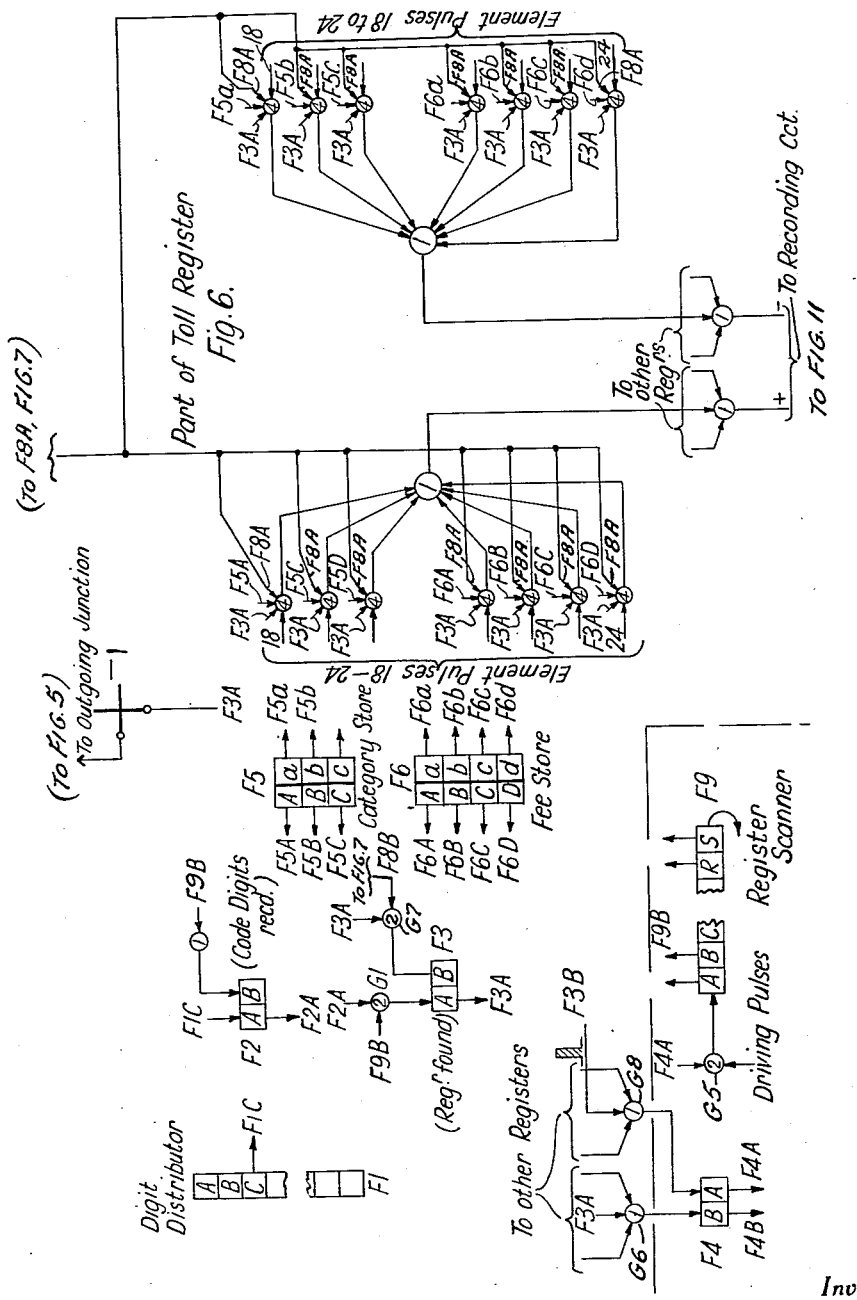

An outgoing junction is seized from a level of a selector in the well known manner, line relay A operating followed by relay B. A Toll Register is then associated with this outgoing junction via a connecting switch as in known Automatic Switching Systems such a connecting switch being shown for the purposes of this description as a Cross-bar 1 switch (Fig. 6). Dialled information is repeated by the "A" relay via this connecting switch to the Register, which is not shown in detail since again it is fully described in existing Switching Systems. The Toll Register accepts and stores such dialled information and a Digit Distributor F1 steps on the reception of each digit. F1 consists of a series of devices as for instance gas filled tubes each tube being ionised in turn on the reception of each digit. For the purposes of description it is assumed that the first three digits dialled by the Calling Subscriber are indicative of the required exchange and as such the register will recognise such a digital combination as corresponding to a certain Call Category with a basic fee.

Figure 1:
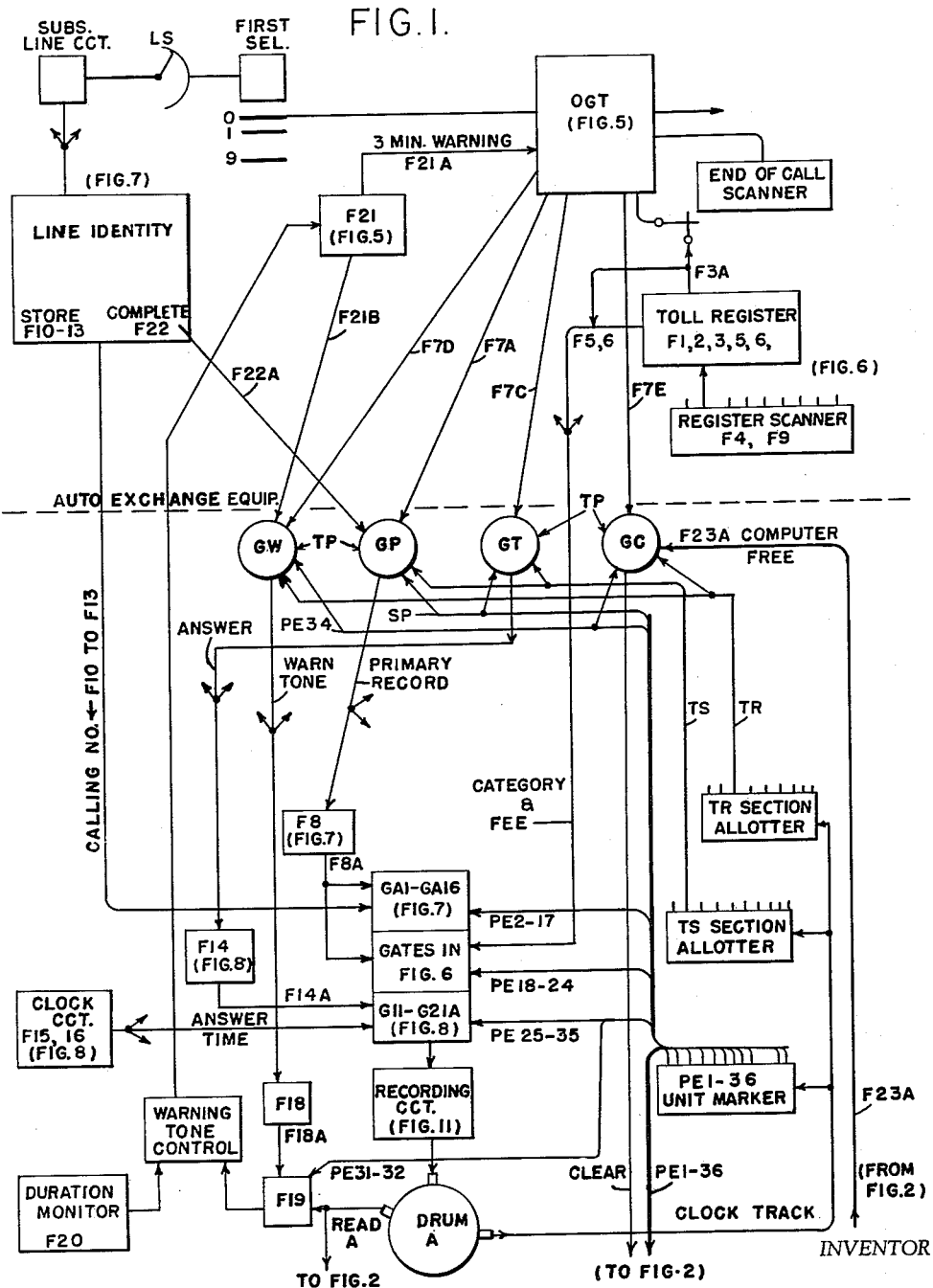

Such registers which will discriminate on the type of call and the chargeable fee are again well known and Fig. 6 shows a Category and Fee Store which will register such information. These stores are shown symbolically as F5 and F6 consisting of pairs of devices such as A, a, B, b, and C, c, each pair constituting a flip-flop such that in each store such flip-flops will be set to such a pattern depending on the information to be stored. For instance such information could correspond to A, b and C being conductive in F5 determining the Category of call, and a, B, c, and D being conductive in F6 determining the basic fee. After receipt of the third digit the digit distributor F1 has stepped to its third position and an output F1C is derived from its C stage. F1C is applied to stage A of flip-flop F2 and will operate it to the "A" condition. F9 illustrates a cyclic counter consisting of a train of devices such as gas filled tubes wherein the ionisation of one tube deionises the preceding tube in a well known manner. Pulses for stepping this counter are shown being fed to counter F9 via a gate G5 controlled by F4A which is assumed to be operative. When a driving pulse coincides with an output from flip-flop F4A, the counter F9 is stepped one position. Outputs from this counter are associated with each register and as shown, when F9B is operated then gate G1 is opened and F3 flip-flop conducts on the "A" side. F3A via a common gate G6 will operate flip-flop F4B, rendering output F4A thereof ineffective, the gate G5 for connecting the driving pulses to the counter F9 will be closed and the counter will halt and remain with its stage F9B operative. F3A having operated, the output F3A is connected via the connecting switch 1 to the Outgoing Junction and will set counter F7 in this circuit to its "A" position. Counter F7 again is a train of gas discharge tubes connected in a well known manner such that ionisation of one tube will deionise other tubes which may be conducting. Output F7A is applied to the grid of valve V1 and will operate relay IS in the anode circuit thereof. Relay IS will apply a positive potential via its contact IS-1 to the "P" wire (Fig. 5) and which via the Selector (Fig. 1) will be connected to the Calling Subscriber's Line Circuit. This signal appearing on the "P" wire will initiate the identification of the Calling Subscriber as fully described, for instance, in copending application No. 438,719, filed June 23, 1954 where, in response to this signal, the identity of the Calling Subscriber's number is determined and registered on groups of Thyratrons, one group for registering the Thousands Digit, another group the Hundreds Digit and so on. The outputs from these Thyratrons can be connected to the Identity Store, Fig. 7, such that the identity of the Calling Subscriber can be registered by setting the flip-flops in each store such as F10 to a pattern corresponding to digits comprising the subscriber's number. Thus initially Stores F10, 11, 12 and 13 representing the thousands, hundreds, tens and units digits respectively, are set to the $a$, $b$, $c$ and $d$ sides and assuming the thousands digit to be 5 then the output from the thyratron in the Identification Circuit will cause A and C to conduct corresponding to 5 in a binary notation; store F10 will then be in the condition of A, C, $b$ and $d$ conducting. Stores F11, 12 and 13 will be similarly set. A condition is also supplied from the Identification Circuit described under said last mentioned copending application to indicate that Identification is complete and this signal will cause F22A to conduct.

Figure 11:
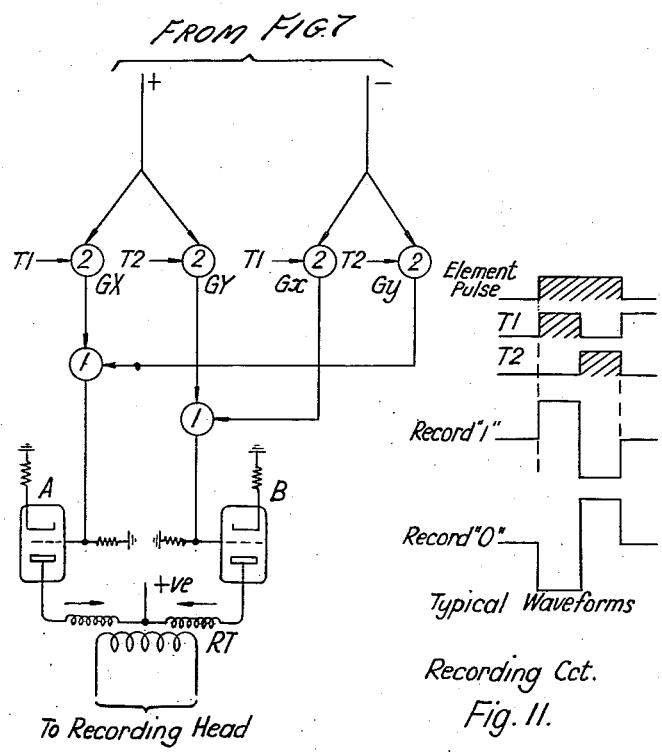

The calling subscriber's identity has thus been registered, the Register has stored call particulars, that is category of call and basic fee, and the next operation is to record these particulars on the section of the Drum allocated to the Outgoing Junction which is associated with the Register A which has initiated the Identification process mentioned. Referring to the Outgoing Junction, F7A (Fig. 5) is operative only in this one circuit, F22A (Fig. 7) is also operative so that gate GP (Fig. 5) will open only when a track pulse TP is present indicating the track in which a section allocated to this junction is present, when track section pulse TS occurs indicating the track section for this junction and when start pulse SP which is the pulse indicating the beginning of the track section arrives, all five events being concurrent. Gate GP opens therefore at the beginning of the correct track section and will cause F8A to become operative, Fig. 7. In this figure the outputs A, B, C and D of stores F10, F11, F12 and F13 are connected to 16 gates GA1 . . . GA16 and outputs $a$, $b$, $c$ and $d$ to a further 16 gates $Ga$ . . . $Ga$16. F8A supplies a control to all thirty-two gates. If F10A is operative then gate GA-1 opens on arrival of element pulse 2, if F10$a$ was conductive then $Ga$-1 would open, in either case a signal is supplied through these gates to the + or — leads connected to the recording circuit. Following conventional recording techniques on magnetic devices it is arranged to record 1 in the appropriate element if A, B, C or D are operative and 0 if $a$, $b$, $c$ or $d$ are operative. It can therefore be seen that gates such as $Ga$-1 . . . GA16 or $Ga$-1 . . . $Ga$16 are opened in sequences due to the element pulses 2 to 17 and 1 or 0 recorded so that information in the Identity Store is now transferred to the Drum. Fig. 11 illustrates a typical recording circuit. Assuming a signal is applied to the + lead from Fig. 7 during an element pulse. Then gate GX is opened for the duration of the T1 control pulse, a positive voltage is applied to the grid of valve A and it conducts, a pulse is fed via transformer RT to the drum recording head. Pulse T2 similarly closes gate GY, thereby applying a positive voltage to the grid of valve B which conducts and a pulse of opposite sense is fed to the recording head via transformer RT. It will be noted that the primary of transformer is center tapped and develops voltages in the directions shown by the arrows associated therewith. A waveform such as shown as Record "1" is therefore produced and the element on the drum is magnetised. Similarly if a signal is connected to the — lead it can be seen that gates G$x$ and G$y$ are opened in sequence, valves B and A conduct in that order and a waveform of opposite polarity is produced and the element is magnetised in an opposite sense. Therefore as gates such as GA-1 and G$a$-1 (Fig. 7) are opened it can be seen that elements on the drum are magnetised depending on the Identity Store, Fig. 7, and the Calling Subscriber's Number is therefore recorded on elements 2 to 17. In a similar manner information is extracted from the Category and Fee Stores in the Toll Register (Fig. 6). Each gate supplying signals to the + and — leads to the recording circuit is controlled by F3A and F8A and is operative in turn by element pulses 18 to 24 depending on the outputs of the Stores F5 and F6, Fig. 6, the Call Category is therefore recorded on elements 18 to 20, and the Fee on elements 21 to 24.

Figure 3:
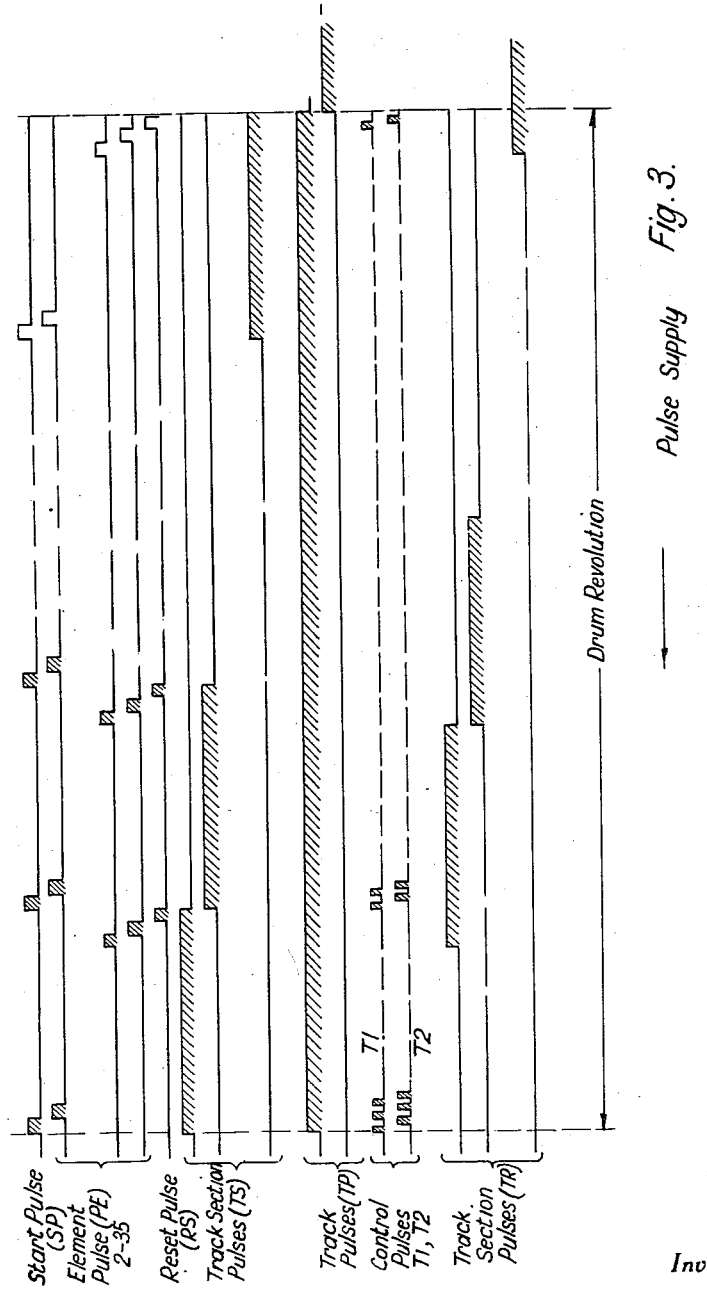
Figure 7:
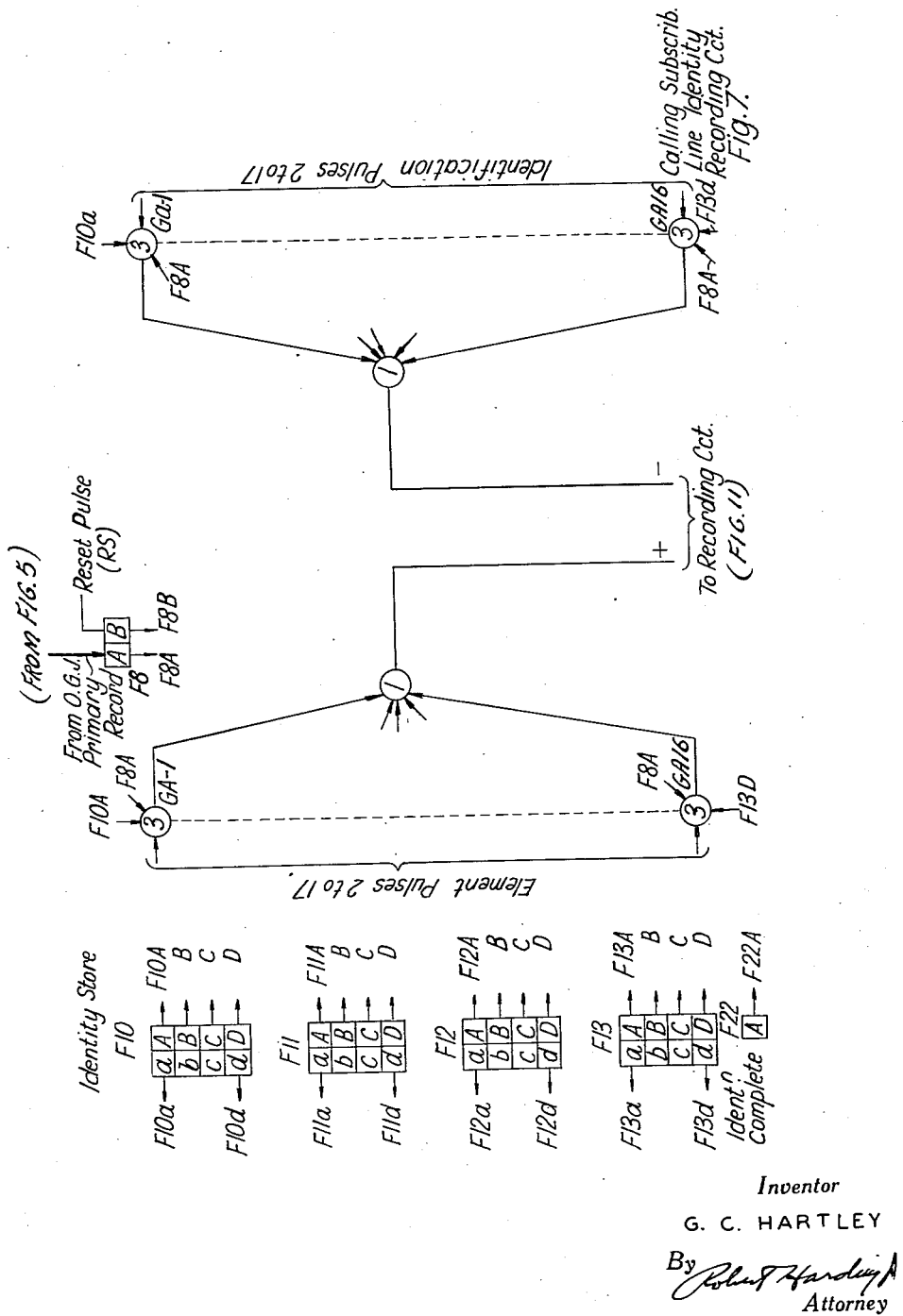

At the end of the track section the reset pulse RS (Fig. 3) will operate the flip-flop F8, Fig. 7, to the B side and so the control pulse F8A is removed from all gates in Figs. 3 and 4 preventing further recording. Flip-flop F3, Fig. 6, is operated to its B side via a gate G7 controlled by F3A and F8B. F3B will in turn supply a pulse via gate G8 to operate the flip-flop F4 to its A condition and it can be seen that the Register Scanner F9 will commence to step in response to the driving pulses, and will again stop when another Register is found with its flip-flop F2 conductive on its A side and whose output will be applied to F4B via gate G6. The output from F3A disappears when F3B is operative, the signal is removed from the Outgoing Junction (Fig. 5) and F7B in this circuit is operated via a gate G9 controlled by F7A and F8B. F7A is rendered non-operative valve V1 ceases to conduct and relay IS releases, and the signal to initiate identification of the Calling Subscriber is removed from the "P" wire by the opening of contact IS-1. The Digit Distributor F1 in the Toll Register (Fig. 6) has stepped past its C position either due to the reception of further digits in the Register or it could be stepped if required by F3B becoming conductive. F2A cannot be operated in the Register again because the removal of the F1C input precludes same, similarly F3A remains unoperated and all gates connected to the Register Stores F5 and F6 will be shut so that once information has been extracted from the Register it cannot be re-recorded.

The condition now is that the Calling Subscriber's Number, Call Category and Fee all pertaining to a certain Outgoing Junction has been recorded on a section of the Drum allocated to that Junction. The Register continues to control the establishment of the call to the required distant exchange in the well known manner and releases when the connection is established.

When the called subscriber answers, relay D (Fig. 5) in the Outgoing Junction will operate in the well known manner and F7C becomes operative via a gate G10 controlled by F7B and a pulse derived from contact D-1 controlled by the operation of relay D. It is now required to record the time of answer on the track section of the Drum allocated to this Junction. Gate GT, Fig. 5, will close with F7C operative, when pulse TP is present indicating the track on which the track section is present, when pulse TS is present indicating the correct track section and finally wtih pulse SP present indicating the beginning of the correct track section. F14A will therefore be operative, Fig. 8, and the time of answer is recorded as follows.

Figure 8:
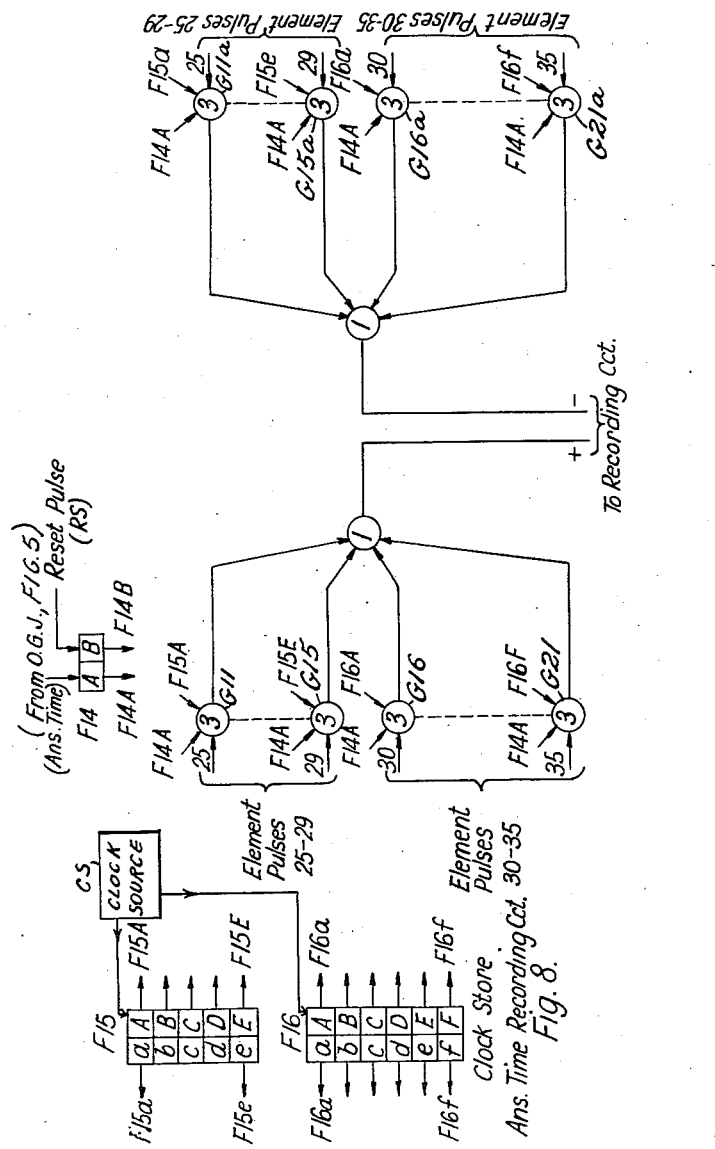

F15 and F16, Fig. 8, are stores consisting of flip-flop pairs, F15 storing the hours and F16 the minutes as fed from a clock source CS. This information is stored in a binary form and as an example if the time of answer was 17.42 then the hour store F15 would be in the condition of A, E, b, c, d operative where A, B, C, D and E correspond to 16, 8, 4, 2 and 1 respectively. Similarly the minutes store would be in the condition of A, C, E, b, d, f operative corresponding to 42 minutes where A, B, C, D, E and F respectively correspond to 32, 16, 8, 4, 2 and 1. These stores will of course be continually changing and the time will always be indicated on a 24 hour basis by the outputs from the flip-flops in such stores. Gates G11 . . . G15, G16 . . . G21 are connected to the outputs A, B etc. of stores F15 and F16 respectively. Gates G11a . . . G15a and G16a . . . G21a are connected to the outputs a . . . e and a . . . f of stores F15 and F16 respectively. The first mentioned gates are controlled by F14A and will be opened in sequence by element pulses 25 to 35 depending on the outputs from the Clock Store, and signals will be applied to the + or − leads to the Recording Circuit depending upon closure of a gate in either of the said groups and the time of answer will be recorded on the drum.

F14B will become operative when the Reset pulse RS arrives, all gates connected to the Clock Store will be closed and F7D (Fig. 5) will be operated in the Outgoing Junction via a gate G22 controlled by F14B and F7C. The position now is that on the track section allocated to this Junction, elements 2 to 17 have stored the Calling Subscriber's Number, elements 18 to 20 the Call Category, elements 21 to 24 the Fee, elements 25 to 29 the hours and elements 30 to 35 the minutes which together give the time of answer of the call.

Figure 9:
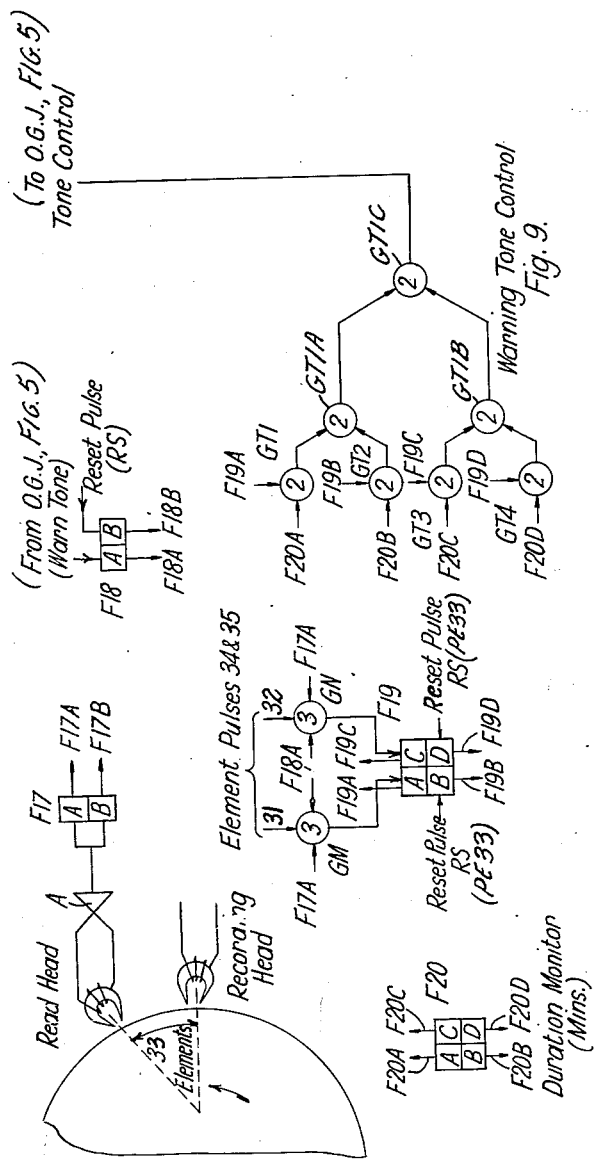

Fig. 9 shows the circuit for supplying a tone to the calling subscriber if the call lasts more than 3 minutes. A recording and read head are shown angularly spaced around the drum periphery 33 elements apart so that as element position 1 at the beginning of a track section is passing under the Read head the 34th element position in the same track section is passing under the Recording Head. Thus, as indicated in Fig. 4, when the last 2 elements (elements 34 and 35) of the 6 elements which record the time of answer in minutes are passing under the Read head elements 31 and 32 are passing under the Recording head; that is, elements 34 and 35 pass under the Read head at clock pulse times PE31 and PE32. A Duration Monitor F20 is also shown consisting of 2 flip-flops AB and CD respectively and it can be arranged that such a monitor can record the last 3 minutes of the time. For instance, a clock store similar to that in Fig. 8 can be controlled by a clock which is always maintained 3 minutes behind correct clock time and the conditions of the "2" and "1" minute stages of the lagging time store can be transferred to F20A–B and F20C–D of the Duration Monitor.

Such a clock store which is 3 minutes behind the Clock Store in Fig. 8 is therefore assumed to control the Duraton Monitor.

In the Junction Circuit, Fig. 5, F7D was operative when the time of answer of the call had been recorded and for the purposes of description it is assumed that F21B is operative as described later. Gate GW is controlled by F21B and F7D and this gate will be closed only when pulses TP, TR and PE 34 indicative of the track in which the track section allocated to the junction is situated, the track section for the junction and the beginning of this track section respectively, are present under the Read head, as may be understood from Fig. 4. When gate GW is opened F18A (also see Fig. 1) is operative. As the last 2 elements of the minutes portion of the time of answer pass under the Read Head, F17 (Fig. 9) which is connected to the Read Head through amplifier A will detect the state of these elements it being assumed that F17A responds if 1 has been recorded and F17B if 0 has been recorded as previously described. Gates GM and GN are controlled by the output from 17A, by F18A and element pulses 31 and 32 so that the store F19 will record the condition of these last two elements on the Drum. If the call has persisted for the period of 3 minutes then it can be seen that ultimately the outputs from stores F19 and F20 will agree since the monitor which is always of 3 minutes duration will now register the same as F19. When the outputs A, B, C and D of stores F19 and F20 agree then gates GT1A, GT1B and GT1C, GT1 to GT4 will all open and via the other gates a signal is applied to the OGJ Tone Control Lead (Fig. 5) which will cause F21A to become operative in the Junction Circuit rendering F21B unoperative. The output from F21A will apply a positive potential to the grid of valve V2 and thereby operate relay T connected in the anode circuit thereof and a tone will be inductively supplied to the Calling Subscriber via contact T1 and applied to the windings of the "A" relay. After a suitable period a pulse shown as PT will open gate GF, since F21A is operative and F21B now becomes operated thereby rendering F21A unoperative. Relay T releases and tone is disconnected.

When the calling subscriber clears at the end of the conversation, relay A releases followed by relay B. F7E becomes operative via a gate G23 which is opened due to F7D operative, contact B1 closed since relay B released. Call particulars relating to the calling subscriber which have been stored on a track section of the "A" Drum are now extracted and this information is passed to an intermediate store associated with a computer. As previously mentioned the Read Head (Fig. 9) was displaced by 33 element positions from the Record Head and when recording information in a track section, pulses TP, TS and PE indicative of the track, track section and track elements were used. For reading information from the drum, pulses TR which are displaced by 33 elements from the TS pulses are used as shown in Fig. 3 and these pulses cooperate with element pulses for extracting information as shown in Table I, Fig. 4.

Figure 5:
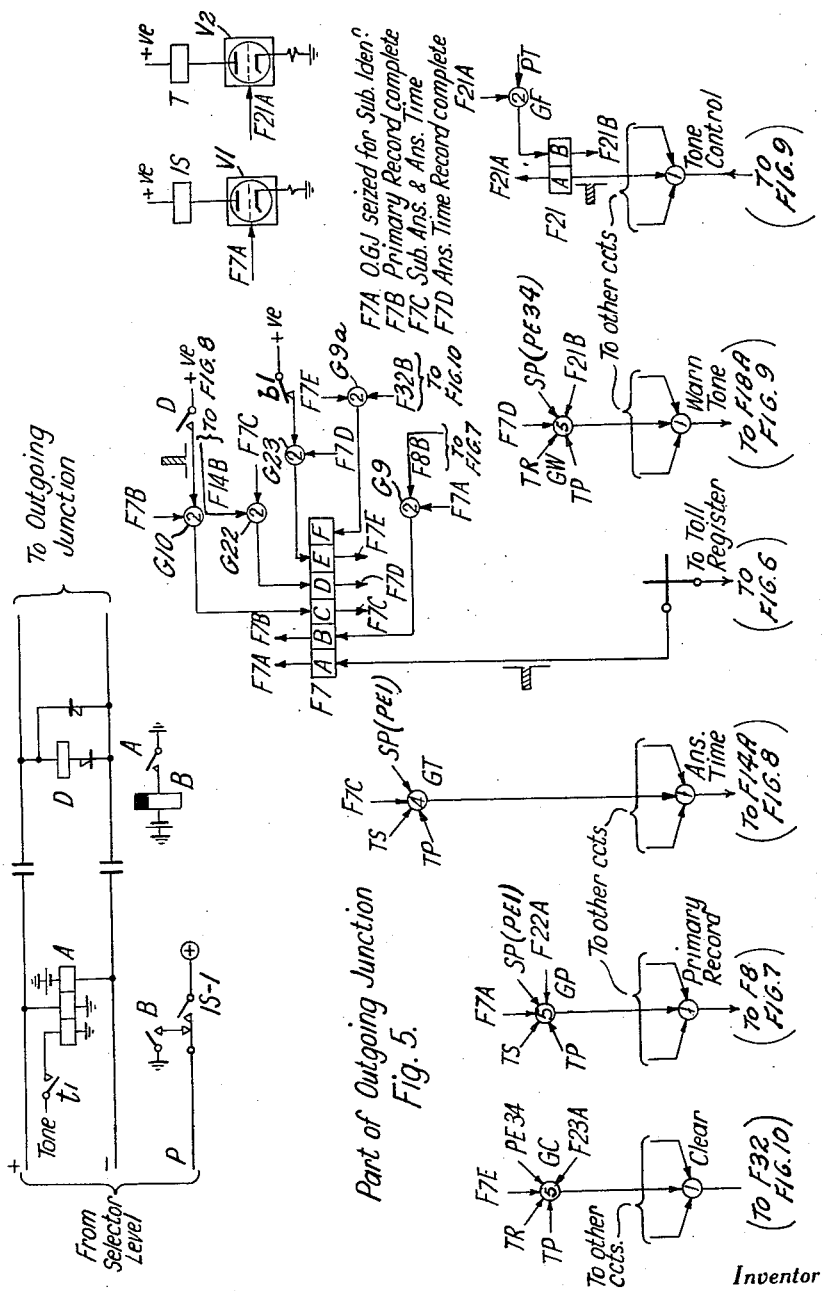
Figure 10:
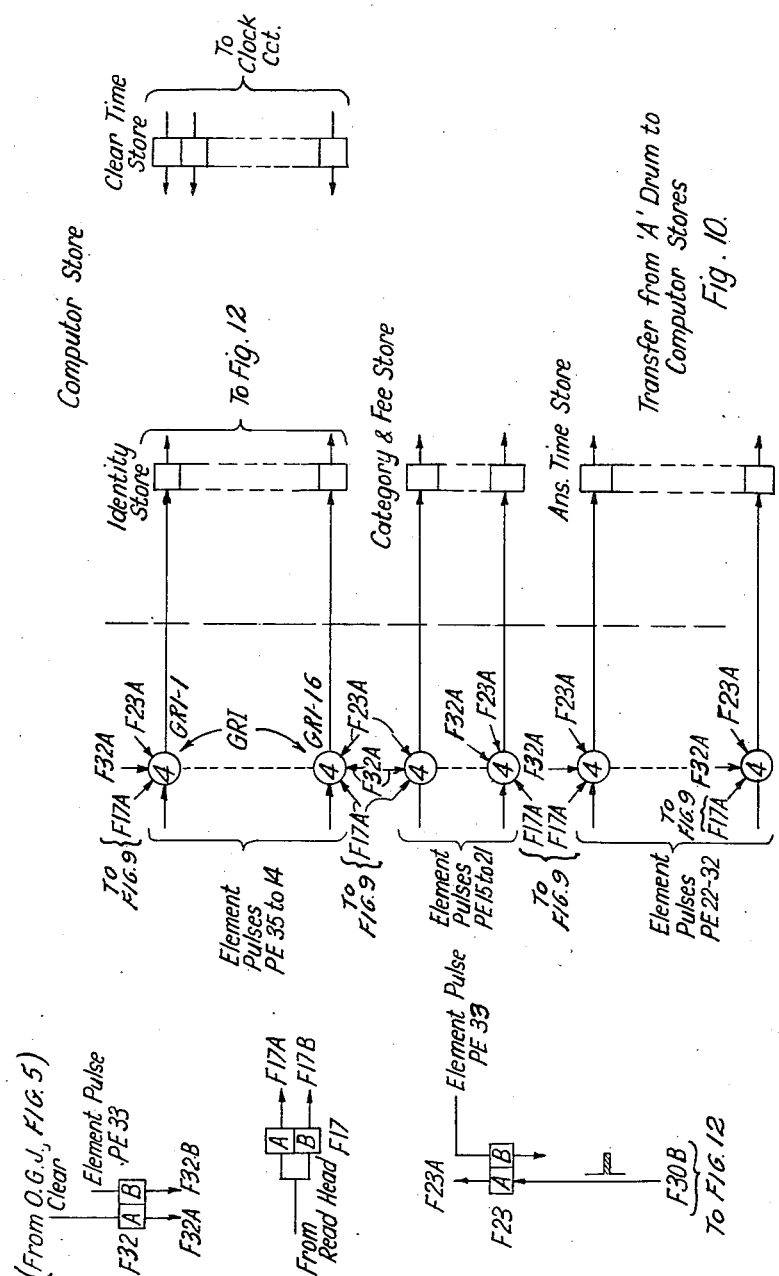

Referring to the Outgoing Junction Circuit, Fig. 5, when the calling subscriber clears, F7E was made operative as previously described. Gate GC (also see Fig. 1) is controlled by the output of F7E, by pulse TP which is indicative of the track on which information has been recorded, by pulse TR which indicates the section used for recording information relevant to the Junction and by an element pulse PE which indicates when the beginning of the recorded information passes under the read head. It is also controlled by the output of F23A indicating the computor is free. When GC opens, then F32A, F22A, Fig. 9 is operative and F17 Fig. 10 which is connected to the output of the Read Head amplifier responds as the elements pass under the head, F17A if a "1" has been recorded and F17B for "0." Sixteen gates shown as GRI1 . . . GRI16, Fig. 10, are controlled by F32A and F23A, by F17A and PE pulses corresponding to elements in which the Identity of the Calling Subscriber has been recorded. F23A is only operative if the Computer is free and for the purposes of description it has been assumed that the Computer delivers a pulse F30B when it is free. Gates GRI1 . . . GRI16 therefore open in sequence for every operation of F17A and an Identity Store shown as part of a Computer Store will therefore record the Calling Subscriber's Number. In exactly the same manner information regarding the Call Category, Fee and Time of Answer will be received on stores in the Computer as shown. When all the information has been extracted, F32B and F23B are operated by PE pulse, in this case element pulse 33 and the output of F32B in combination with F7E will cause F7F to be operative. In Fig. 5, via gate G9a and gate GC will now shut, since F7E will become inoperative. All information regarding call particulars associated with the Outgoing Junction has now been transferred to the Stores in the Computer (Fig. 10).

In Fig. 10 a Clear Time Store has been shown as part of the Computer Store and it is assumed that this Store is continually indicating the Time as registered by a clock. Using recognised computer practices, the Answer Time and Clear Time stores can be compared, a subtraction performed an the duration of the call can be established. Again since the category and fee of the call has been recorded the computer can again by recognised means, and knowing the duration of the call, determine the chargeable fee.

Figure 2:
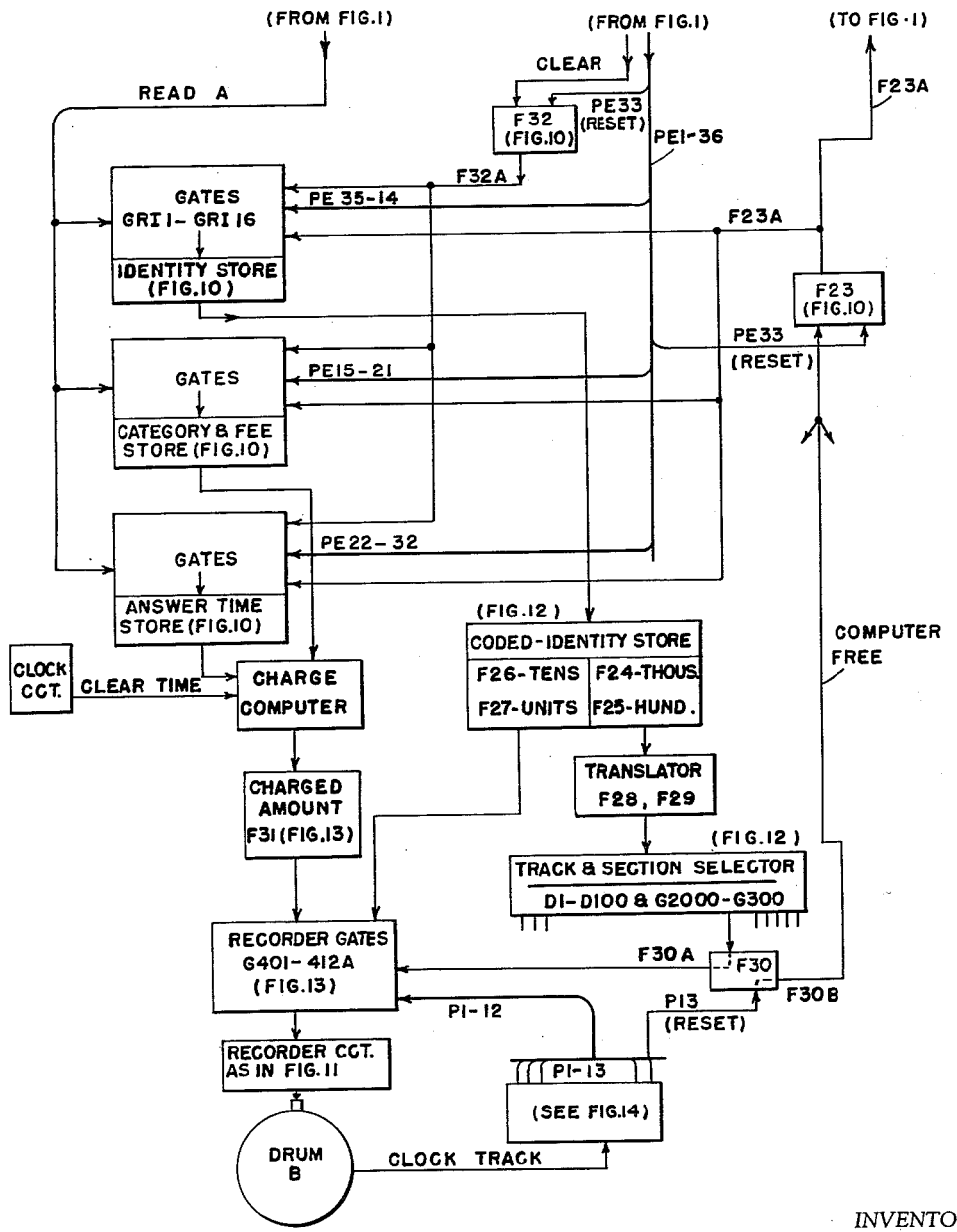
Figure 12:
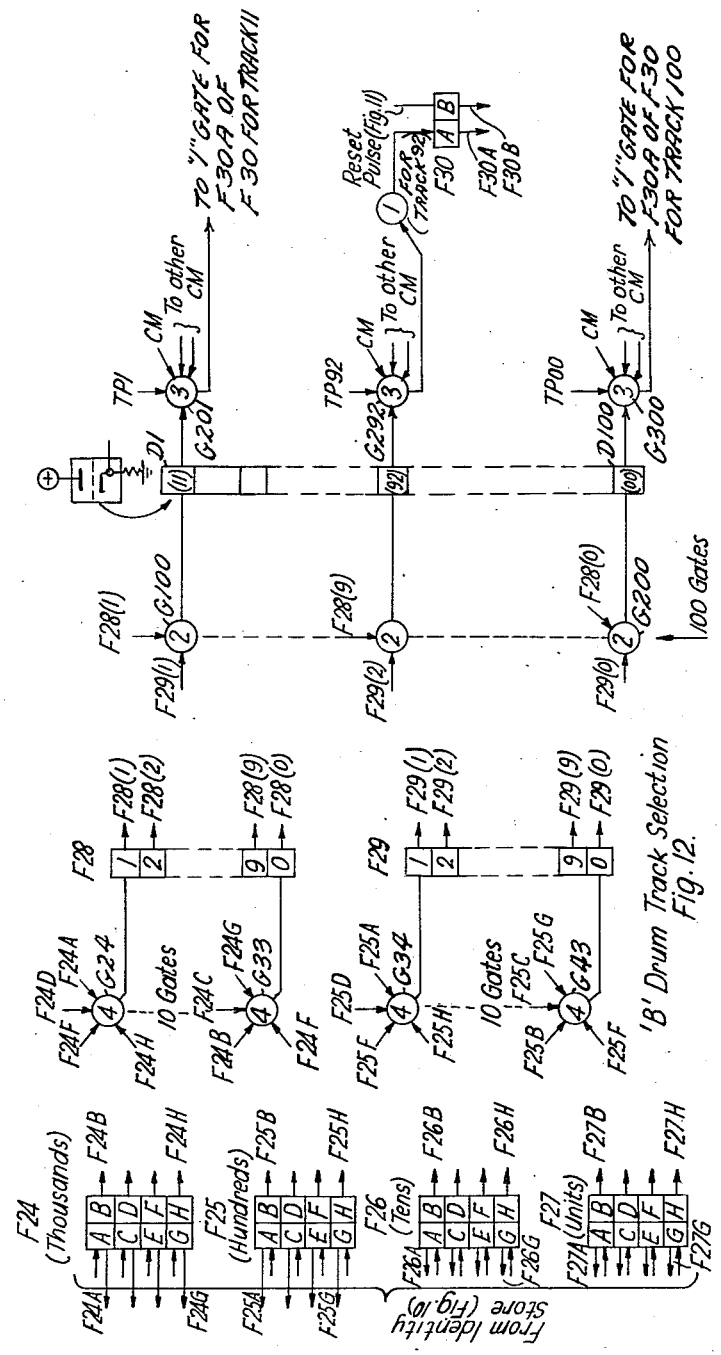

A "B" drum is shown, (Fig. 2) the purpose of which is to store the chargeable fee and the Calling Subscriber's Number and it is arranged for each track on this Drum to be allocated to Subscribers in each Hundreds Groups. Fig. 12 shows the means for selection of the track which is allocated to a group of 100 subscribers. The outputs from the Identity Store Fig. 10 are connected to Stores F24 to F27 (Fig. 12) each consisting of 4 flip-flops such that for example if I is operative B is non-operative. The Calling Subscriber's Number is stored in F24 to F27 as a pattern of conductive devices as for instance A, D, F and H corresponding to 1; B, C, F and H to 2; and B, C, F and G to 0. The outputs from F24 and F25 are connected to gates G24 . . . G33 such that F28(1) conducts if the digit stored is 1 and F28(0) if the digit was 0. Thus stores F24 to F27 register the Calling Subscriber's Number as a Binary Number and stores F28 and F29 have decoded the Thousands and Hundreds, digits into decimal numbers. 100 Gates G100 . . . G200 are shown each of which is controlled by the outputs from F28 and F29 so that one of the 100 Devices D1 . . . D100 becomes conducting according to the thousands and hundreds digits. This conductive device shown as a valve, therefore indicates the "100" group in which the calling subscriber is located. The output from such a device is connected to a gate also controlled by a pulse TP indicative of the track allocated to the groups of 100 subscribers and by pulses CM (see Fig. 14) which indicate free portions of such a track. Any truck section which is free delivers its CM pulse as for instance due to the presence of a magnetised element or "chalk mark" at the beginning of the section, such a pulse being absent if the particular track section has been used. The use of such a feature is described in copending applications bearing Serial Nos. 289,383 and 289,385, both filed May 22, 1952. Thus if the subscriber is located in the hundreds group "92," a gate G292 connected to the output of valve 92 becomes conductive when pulse TP92 and a CM pulse is present.

Figure 13:
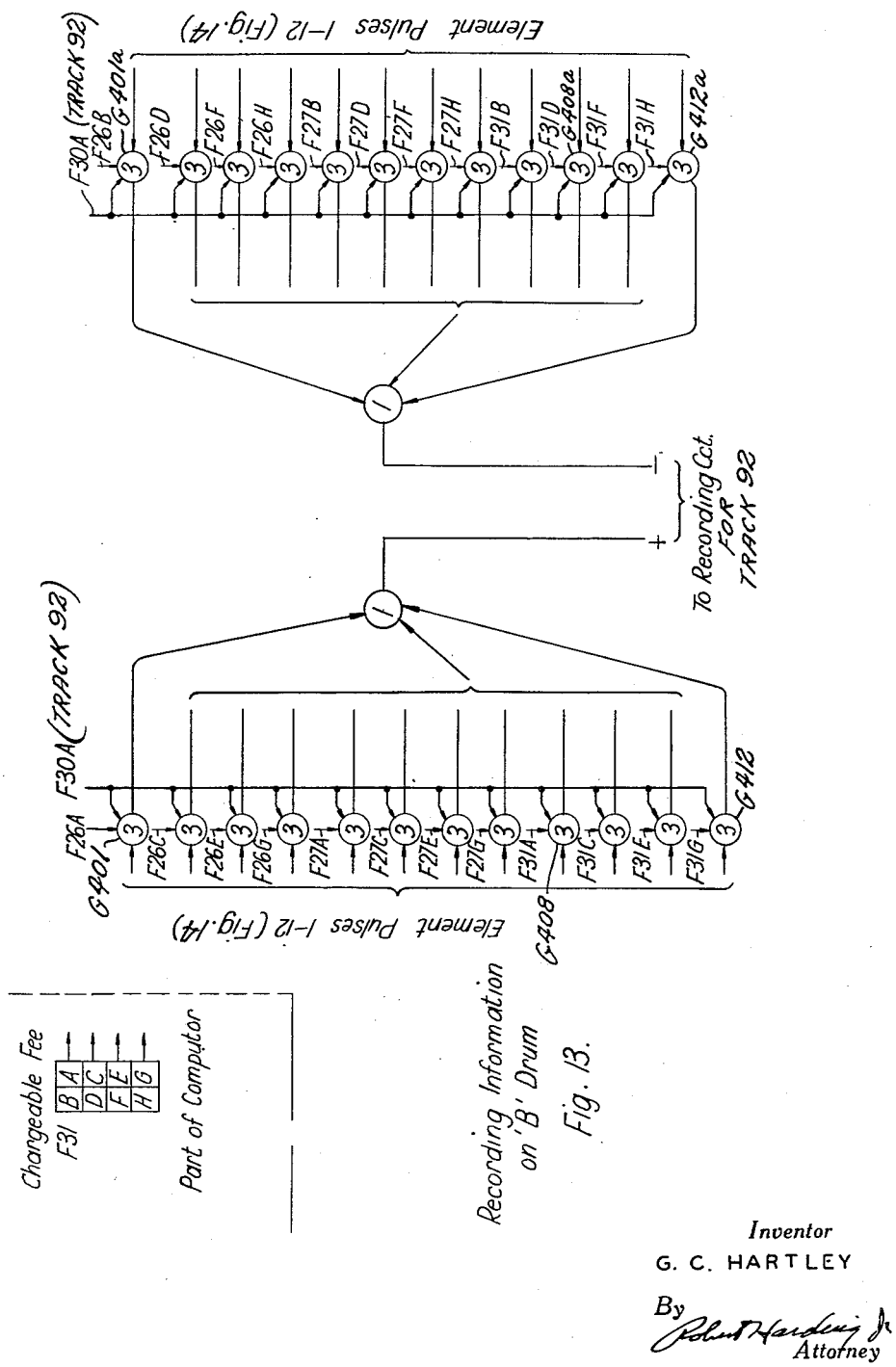

F30A is operated via a gate connected to the output of gate G292 just mentioned and with F30A conductive, the Tens and Units digits of the Subscriber's Number together with the chargeable fee as determined by the Computer is recorded in a free section on the correct track of the B Drum as shown in Fig. 13. It is evident that each of the gates G201 to G300 has its output applied to side A of a trigger such as the trigger F30 shown connected with the gate G292, and each of such triggers will be in control of its own associated arrangement of gates, such as the gate arrangement shown in Fig. 13, for controlling the recording of data on a different one of the plurality of tracks of the drum B. As previously mentioned it has been assumed that the Computer has assessed the chargeable fee and this information has been recorded in a Store F31 as shown in Fig. 13. Two series of gates G401 . . . G412 and G401a . . . G412a are shown connected to the A, C, E, G and B, D, F, H sides respectively, of the Tens and Units Stores Fig. 12 and to the similar outputs of the chargeable fee store. These gates are controlled by the output of F30A and are actuated in sequence by element pulses P1 to P12 derived from a clock track of drum B, these pulses marking and corresponding to the element positions on the "B" drum, Fig. 14. Signals are applied to the + and — leads of a recording circuit, such as the circuit shown in Fig. 11, under control of these gates and information is recorded on the "B" drum in exactly the same manner as already described for recording on the "A" Drum. At the end of recording the reset pulse P13 causes F30B to be operative and F30A non-operative which opens all gates in Fig. 13. F30B causes F23A (Fig. 10) to become operative due to a pulse derived from the output of F30B and with F23A operated, the gates GC (Fig. 5) in all Outgoing Junctions are prepared for recording the next clearing condition. The "B" drum has now recorded in a free section of the track allocated to a group of 100 subscribers the identity of the Calling Subscriber in that group together with the chargeable fee. Although not shown, when a free track section has been used for recording information the CM pulse indicative of a free section can be removed and no further information can be recorded in this section.

Stored information can be extracted from the B drum and used in any desired way for preparing subscribers' accounts.

While the principles of the invention have been described above in connection with specific embodiments, and particular modifications thereof, it is to be clearly understood that this description is made only by way of example and not as a limitation on the scope of the invention.

What I claim is:

1. Apparatus for storing call accounting data in a telecommunication system wherein any of various substations may make call connection via any one of selectively available trasmission channels, comprising a seizable junction circuit in each transmission channel, first data storing means including a plurality of individual temporary data stores each allotted to a different junction circuit for temporarily storing data pertaining to a call from any of various substations making call connections via the channel including the junction circuit to which the temporary store is allotted, source means for call data including substation identity, cyclically effective means conditioned under control of a seized junction circuit for causing transfer to its allotted store of call data from the source means including the identity of the substation liable for the call connection, second data storing means including a plurality of re-usable multiple stores each associated with and having numerical relation to a group of the substations, means controlled by the seized junction circuit and effective upon conclusion of a call connection for reading out the data from the individual store allotted to the seized junction circuit, means responsive to and effective in accordance with a substation identity portion of the data read out of the individual store for selecting one of said multiple stores to receive call accounting data, and means for utilizing other portions of the data read out of the individual store for applying to the selected multiple store accounting data for the call made by the identified substation.

2. Apparatus according to claim 1, said first data storing means being a continuously cycling magnetic record medium and the individual stores being track sections of said medium, magnetic recording equipment for each track of the medium, each track section being available for recording by the recording equipment once per repetitive cycle of the record medium and in a fixed period of each cycle, said cyclically effective means conditioned under control of a seized junction circuit including interconnecting equipment for operatively interconnecting with the recording equipment different portions of said call data source means during a plurality of cycles of the record medium, and section allotting means for timing effectiveness of the interconnecting equipment to occur during the period in each of the cycles in which the track section allotted to the seized junction circuit is available for recording, whereby call data from different portions of said source means are recorded during a plurality of cycles in the allotted track section.

3. Apparatus according to claim 2, in which the call data recorded in a track section includes the start time of a connection, means effective under control of the seized junction circuit for repetitively reading out of the allotted track section during successive cycles a pertinent portion of the start time and producing signals indicative of such portion, a duration monitor for producing signals indicative of a comparison portion of clock time less a predetermined chargeable time period, an electrical comparator receiving the signals from the duration monitor and the cyclically repetitive start time signals derived from the allotted track section and effective upon matching of signals from the duration monitor with the repetitive start time signals for producing an output signal as a manifestation of the passage of the chargeable time period, and means responsive to this output signal for sending a warning signal via the seized junction circuit to the calling substation.

4. Apparatus as defined in claim 1, said second data storing means being a continuously cycling magnetic record medium with parallel tracks, each of said multiple stores being one of said tracks, said means for applying accounting data to a multiple store including magnetic recording means for the track comprising the multiple store, said selecting means for a multiple store singling out for operation the recording means for the track comprising the selected multiple store, and the selecting means also including means responsive to a signal marking a free section of the latter track for restricting the recording means to recording of data in a free section of this track.

References Cited in the file of this patent

UNITED STATES PATENTS

| | | |
|---|---|---|
| 2,165,924 | Goodrum | July 11, 1939 |
| 2,165,925 | Goodrum et al. | July 11, 1939 |
| 2,338,636 | Goodrum et al. | Jan. 4, 1944 |
| 2,513,112 | Shepherd | June 27, 1950 |
| 2,531,622 | Hague | Nov. 28, 1950 |
| 2,580,093 | Hersey | Dec. 25, 1951 |
| 2,594,495 | Retallack | Apr. 29, 1952 |
| 2,595,106 | Scudder | Apr. 29, 1952 |
| 2,886,642 | Morris et al. | May 12, 1953 |
| 2,886,643 | Morris | May 12, 1953 |
| 2,724,741 | Lomax | Nov. 22, 1955 |
| 2,767,246 | Retallack | Oct. 16, 1956 |
| 2,805,286 | Baker | Sept. 3, 1957 |
| 2,851,534 | Bray et al. | Sept. 9, 1958 |
| 2,865,563 | Wright et al. | Dec. 23, 1958 |